United States Patent [19]

Ikeda et al.

[11] Patent Number: 5,923,520
[45] Date of Patent: *Jul. 13, 1999

[54] DEMAGNETIZING CIRCUIT AND CURRENT LIMITING DEVICE

[75] Inventors: Yutaka Ikeda, Youkaichi; Yuichi Takaoka, Shiga-ken, both of Japan

[73] Assignee: Murata Manufacturing Co., Ltd., Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/634,858

[22] Filed: Apr. 19, 1996

[30] Foreign Application Priority Data

Apr. 20, 1995 [JP] Japan .................................. 7-095118

[51] Int. Cl.$^6$ ...................................................... H01F 13/00
[52] U.S. Cl. ........................................... 361/150; 361/267
[58] Field of Search ..................................... 361/149–151, 361/267, 23, 24; 315/8; 338/22 R, 23

[56] References Cited

U.S. PATENT DOCUMENTS

| | | | |
|---|---|---|---|
| 3,944,870 | 3/1976 | Sutton, Jr. et al. ..................... | 361/150 |
| 5,715,130 | 2/1998 | Ikeda ....................................... | 361/149 |

FOREIGN PATENT DOCUMENTS

| | | | |
|---|---|---|---|
| 492314 | 7/1992 | European Pat. Off. ......... | H04N 9/29 |
| 2345841 | 10/1977 | France ........................... | H02H 7/085 |
| 3112556 | 10/1982 | Germany ......................... | H05B 1/02 |
| 3818070 A1 | 12/1989 | Germany ......................... | H05B 1/02 |
| 9214940 | 12/1992 | Germany ........................ | G01K 13/00 |

OTHER PUBLICATIONS

Patent Abstract of Japan, vol. 6, No. 95, Jun. 3, 1982 and JP–A–57 026982.
Patent Abstract of Japan, vol. 10, No. 91, Apr. 1986 and JP–A–60 233989.
Patent Abstract of Japan, vol. 14, No. 142, Mar. 1990 and JP–A–02 005323.

*Primary Examiner*—Ronald W. Leja
*Attorney, Agent, or Firm*—Ostrolenk, Faber, Gerb & Soffen, LLP

[57] ABSTRACT

A demagnetizing circuit and a current limiting device for being built into a power supply circuit of a color television receiver or color monitor display or the like with which it is possible to effect a reliable demagnetizing operation using existing components and without using either a positive characteristic thermistor which reaches a high temperature or a relay circuit. The demagnetizing circuit is connected in parallel with a power supply circuit having a smoothing capacitor and a negative temperature characteristic thermistor or fixed resistance for suppressing surge currents to the smoothing capacitor. It has a thermally actuated switch connected in series with one end of a demagnetizing coil by way of a positive temperature characteristic thermistor which is actuated by heat produced by the temperature negative characteristic thermistor or fixed resistance to cut off a demagnetizing current. The current limiting device within the demagnetizing circuit includes the negative temperature characteristic thermistor or fixed resistance, the positive temperature characteristic thermistor and the thermally actuated switch interposed between the negative temperature characteristic thermistor or fixed resistance and the positive temperature characteristic thermistor. The thermally actuated switch has a thermally actuated member which is caused to bend by heat produced by the negative characteristic temperature thermistor or fixed resistor, and a moving contact point and a fixed contact point which are opened by this bending of the thermally actuated member.

17 Claims, 8 Drawing Sheets

DEMAGNETIZING CIRCUIT AND CURRENT LIMITING DEVICE

BACKGROUND OF THE INVENTION

This invention relates to a demagnetizing circuit and a current limiting device particularly for use in this demagnetizing circuit.

Figure 9:
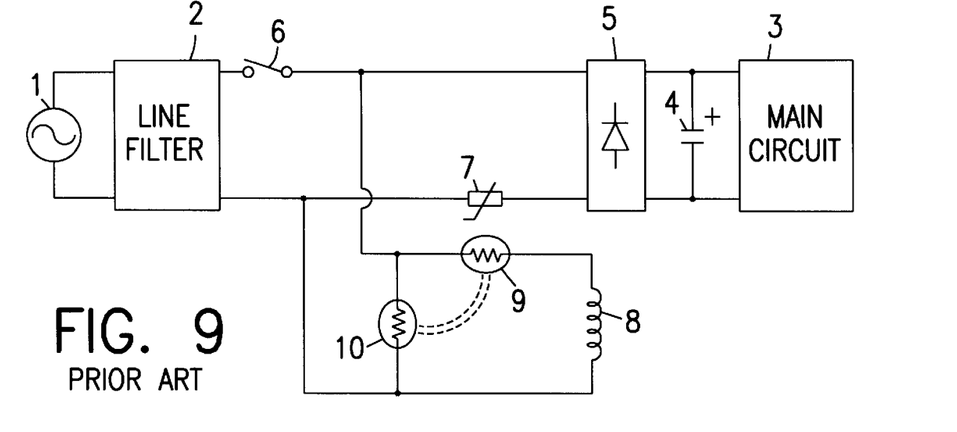
FIG. 9 is a schematic view of a conventional demagnetizing circuit.

Conventionally, a power supply circuit of a color television receiver or color monitor display or the like has a built-in demagnetizing circuit for automatically demagnetizing a cathode ray tube. A first circuit construction of this kind of power supply circuit and the demagnetizing circuit is shown in FIG. 9. That is, this power supply circuit has a line filter 2 connected to a commercial alternating current power supply 1, a smoothing capacitor 4 connected to a main circuit 3 and a rectifier diode bridge 5 interposed between the line filter 2 and the smoothing capacitor 4. Between the line filter 2 and the rectifier diode bridge 5 are disposed a main switch 6 and a negative temperature characteristic thermistor (hereinafter called an NTC) 7 for suppressing surge currents to the smoothing capacitor 4. As shown with dotted lines in FIG. 9, the NTC 7 is sometimes disposed between the smoothing capacitor 4 and the rectifier diode bridge 5; also, a fixed resistance (not shown in the drawings) is sometimes used instead of this NTC 7.

A demagnetizing circuit is connected in parallel with the power supply circuit and draws on the commercial alternating current power supply 1 from between the rectifier diode bridge 5 and the main switch 6 and between the line filter 2 and the NTC 7, and comprises a demagnetizing coil 8 for demagnetizing a cathode ray tube (not shown in the drawings), a first positive temperature characteristic thermistor (hereinafter called a PTC) 9 connected in series at one side of the demagnetizing coil 8 and a second PTC 10 connected in parallel between the other side of the demagnetizing coil 8 and the PTC 9. The resistance of the PTC 9 increases as its temperature rises, gradually decreasing a demagnetizing current flowing to the demagnetizing coil 8 and the PTC 10 heats the PTC 9 to reduce the residual demagnetizing current However, when the main switch 6 is closed in the conventional power supply circuit and demagnetizing circuit described above, the NTC 7 or fixed resistance and the first and second PTCs 9 and 10 give off heat, so that while the main switch 6 is closed about 2 to 3 watts of electrical power are constantly consumed. Consequently, a printed circuit board (not shown in the drawings) on which the various components are mounted is damaged and other components deteriorate. In particular, because this PTC 10 reaches temperatures of over 150° C., its life is unavoidably short.

Figure 10:
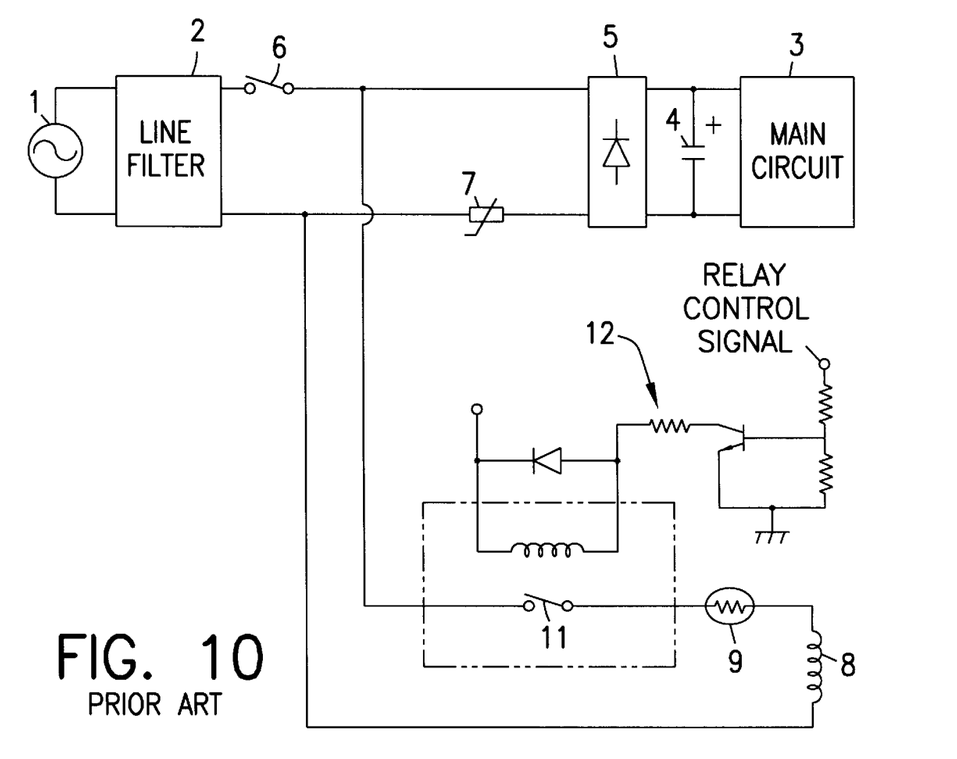
FIG. 10 is a schematic view of another conventional demagnetizing circuit

To avoid these problems, a second circuit construction shown in FIG. 10 comprising a relay circuit interposed between a power supply circuit and a demagnetizing circuit has also been employed. In this conventional construction the PTC 10 is dispensed with. A mechanical relay 11 is connected to one side of the PTC 9, and a demagnetizing current is cut off by the mechanical relay 11 being opened by the operation of a relay driving circuit 12 based on a relay control signal. However, when this kind of construction is employed the relay driving circuit 12 is necessary Thus, not only is the occupied circuit board area increased by the relay driving circuit 12 but also there is the problem that the cost is increased along with the use of the expensive mechanical relay 11.

SUMMARY OF THE INVENTION

The present invention was devised in view of these problems, and an object of the invention is to provide a demagnetizing circuit with which it is possible to conduct a reliable demagnetizing operation using existing components and without using either a PTC which reaches a high temperature or a relay circuit. A further object is to provide a current limiting device that is particularly adapted for use in the demagnetizing circuit.

A first demagnetizing circuit according to an embodiment of the invention is connected in parallel with a power supply circuit having a smoothing capacitor and a negative temperature characteristic thermistor or fixed resistance for suppressing surge currents to the smoothing capacitor and to achieve the above-mentioned object and other objects comprises a thermally actuated switch connected in series with one end of a demagnetizing coil by way of a positive temperature characteristic thermistor and actuated to perform current cutoff by heat produced by the negative temperature characteristic thermistor or fixed resistance.

A second demagnetizing circuit according to an embodiment of the invention is similar to the first demagnetizing circuit described above except that the thermally actuated switch is actuated to perform current cutoff by heat produced by both the NTC or fixed resistance and the PTC.

A third demagnetizing circuit according to an embodiment of the invention comprises a first thermally actuated switch connected in series with one end of a demagnetizing coil by way of a positive temperature characteristic thermistor and a second thermally actuated switch connected in series with the other end of the demagnetizing coil, the first and second thermally actuated switches being actuated to perform current cutoff by heat produced by the negative temperature characteristic thermistor or fixed resistance.

A fourth demagnetizing circuit according to an embodiment the invention is similar to the third demagnetizing circuit described above except that the first and second thermally actuated switches are actuated to perform current cutoff by heat produced by both the negative temperature characteristic thermistor or fixed resistance and the positive temperature characteristic thermistor.

A first embodiment of a current limiting device according to the invention comprises a negative temperature characteristic thermistor or fixed resistance, a positive temperature characteristic thermistor and a thermally actuated switch interposed between the negative temperature characteristic thermistor or the fixed resistance and the positive temperature characteristic thermistor. The thermally actuated switch comprises a thermally actuated member caused to bend by heat produced by the negative temperature characteristic thermistor or fixed resistor and a moving contact point and a fixed contact point opened by this bending of the thermally actuated member.

A second embodiment of a current limiting device according to the invention is similar to the first current limiting device described above except that the thermally actuated switch comprises a thermally actuated member caused to bend by heat produced by both the negative temperature characteristic thermistor or fixed resistor and the positive temperature characteristic thermistor and a moving contact point and a fixed contact point opened by this bending of the thermally actuated member.

A third embodiment of a current limiting device according to the invention comprises a negative temperature characteristic thermistor or fixed resistance, a positive temperature characteristic thermistor and first and second thermally actuated switches interposed between the negative temperature characteristic thermistor or the fixed resistance and the positive temperature characteristic thermistor. The first thermally actuated switch comprises a thermally actuated member caused to bend by heat produced by the negative temperature characteristic thermistor or fixed resistance and the positive temperature characteristic thermistor and a moving contact point and a fixed contact point opened by this bending of the thermally actuated member. The second thermally actuated switch comprises a thermally actuated member caused to bend by heat produced by the negative temperature characteristic thermistor or fixed resistance and a moving contact point and a fixed contact point opened by this bending of this thermally actuated member.

According to the first and second demagnetizing circuits described above, the thermally actuated switch is actuated to cut off a demagnetizing current respectively by heat from the NTC or fixed resistance, and by heat from both the NTC or fixed resistance and from the PTC. It is not necessary to use the second PTC or the relay circuit of the conventional examples described above.

According to the third and fourth demagnetizing circuits described above, the thermally actuated switches provided on both sides of the demagnetizing circuit both cut off the demagnetizing current and the demagnetizing coil is thereby isolated from the power supply circuit, and as a result it is possible to prevent the occurrence of a low-frequency electromagnetic field in the demagnetizing coil.

According to the first and second current limiting devices described above it is possible to realize the main elements of the first and second demagnetizing circuits in a single unit, and according to the third current limiting device described above it is possible to realize the main elements of the third and fourth demagnetizing circuits in a single unit.

Other features and advantages of the present invention will become apparent from the following description of preferred embodiments of the invention which refers to the accompanying drawings.

DETAILED DESCRIPTION OF THE PREFERRED EMBODIMENTS

Preferred embodiments of demagnetizing circuits and current limiting devices according to embodiments of the invention will now be described with reference to the accompanying drawings.

Preferred Embodiments of Demagnetizing Circuit

Figure 1:
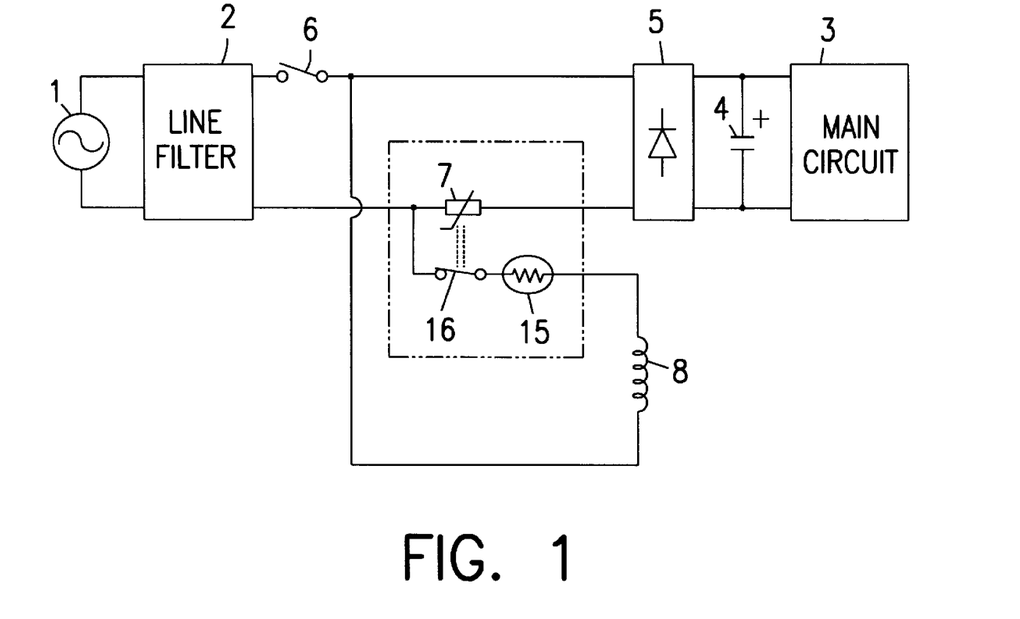
FIG. 1 is a schematic view of the construction of a first preferred embodiment of a demagnetizing circuit according to the invention.
Figure 2:
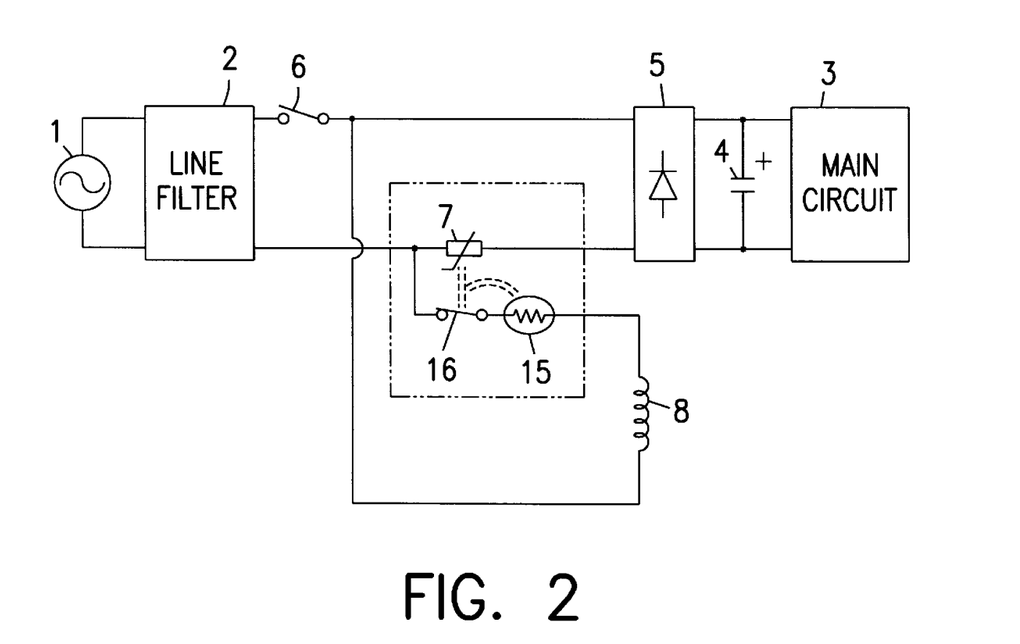
FIG. 2 is a schematic view of the construction of a second preferred embodiment of a demagnetizing circuit according to the invention.
Figure 3:
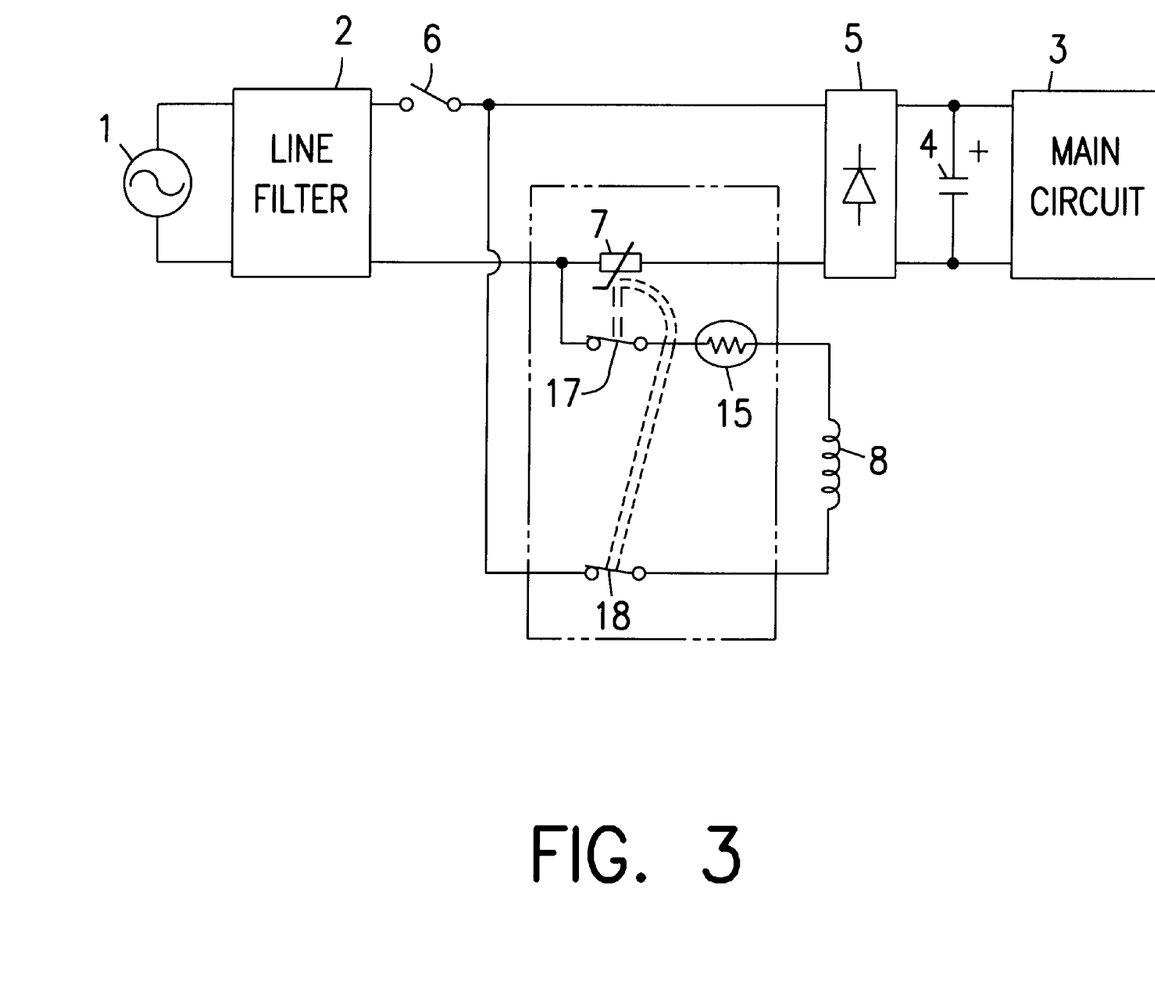
FIG. 3 is a schematic view of the construction of a third preferred embodiment of a demagnetizing circuit according to the invention.

FIG. 1 is a schematic view illustrating the construction of a demagnetizing circuit according to a first preferred embodiment of the invention, and FIG. 2 and FIG. 3 are schematic views respectively illustrating constructions of demagnetizing circuits according to second and third preferred embodiments. In FIG. 1 through FIG. 3, components and parts that are the same as components and parts shown in FIG. 9 and FIG. 10 showing conventional demagnetizing circuits have been given the same reference numbers as in FIG. 9 and FIG. 10.

The demagnetizing circuit of the first preferred embodiment can be built into a power supply circuit of a color television receiver or color monitor display or the like and used for automatically demagnetizing a cathode ray tube, and the power supply circuit and the demagnetizing circuit have the circuit constructions shown in FIG. 1. That is, the power supply circuit here comprises a line filter 2 connected to a commercial alternating current power supply 1, a smoothing capacitor 4 connected to a main circuit 3 and a rectifier diode bridge 5 interposed between the line filter 2 and the smoothing capacitor 4, and a main switch 6, an NTC 7 for suppressing surge currents to the smoothing capacitor 4, or a fixed resistance (not shown in the drawing) replacing the NTC 7 are disposed between the line filter 2 and the rectifier diode bridge 5.

This NTC 7 may alternatively be interposed between the smoothing capacitor 4 and the rectifier diode bridge 5. The NTC 7 should have a B constant of 2000K or more and an R25 in the range 0.5 to 100 Ω. This is because when the B constant of the NTC 7 is less than 2000K and when the R25 is more than 100 Ω, the resistance of the NTC 7 when stable is too high, and with an R25 of less than 0.5 Ω the NTC 7 cannot sufficiently suppress surge currents.

The demagnetizing circuit in this case is connected in parallel with the power supply circuit and draws on the commercial alternating current power supply 1 from between the rectifier diode bridge 5 and the main switch 6 and between the line filter 2 and the NTC 7, and comprises a demagnetizing coil 8 for effecting demagnetizing of a cathode ray tube (not shown in the drawings) and a thermally actuated switch 16 connected to one end of the demagnetizing coil 8 in series by way of a PTC 15. As shown in FIG. 1, this thermally actuated switch 16 cuts off a demagnetizing current flowing to the demagnetizing coil 8 by being opened by heat produced by the NTC 7 or fixed resistance of the power supply circuit, that is, the thermally actuated switch 16 is thermally connected to the NTC 7 or fixed resistance. This cutoff operation is preferably carried out within 1 to 60 seconds (more preferably 1 to 6 seconds) of the start of demagnetizing That is, if cutoff is carried out less than 1 second after the start of demagnetizing the current is cut off before it has been sufficiently attenuated and consequently a sufficient demagnetizing effect is not obtained. On the other hand, if cutoff is not carried out until more than 60 seconds after the start of demagnetizing, picture shake caused by residual current may occur even though the demagnetizing current has been attenuated, and which may cause discomfort for a person viewing the screen of the cathode ray tube.

Also, in this preferred embodiment the PTC 15 should have an R25 of less than 30 Ω and a Curie point (C.P.) in the range 40 to 100° C. (and preferably 50 to 80° C.). This is because when the R25 is over 30 Ω a sufficiently large surge current cannot be obtained and when the C.P. is less than 40° C. the operation of the PTC 15 is greatly affected by the surrounding temperature and when the C.P. is over 100° C. the attenuation of the demagnetizing current is slow. Also, the contact point-opening temperature of the thermally actuated switch 16 should be 45 to 130° C. and the contact point-closing temperature on return should be 40 to 130° C. This is because when the operating temperature is less than 45° C. the thermally actuated switch 16 is greatly affected by the surrounding temperature and because NTCs like the NTC 7 are generally used at temperatures below 130° C.

In a demagnetizing circuit having the construction of this preferred embodiment, as a result of the thermally actuated switch 16 being thermally connected to the NTC 7 or fixed resistance for cutting off the demagnetizing current, it is not necessary to use a second PTC 10 or a relay circuit comprising a mechanical relay 11 as in the conventional demagnetizing circuits described above. In this first preferred embodiment, the thermally actuated switch 16 is actuated to perform current cutoff by heat produced by the NTC 7 or a fixed resistance.

Alternatively, in a second preferred embodiment shown in FIG. 2, the thermally actuated switch 16 is again connected in series to one end of the demagnetizing coil 8 by way of the PTC 150 In this embodiment, the switch 16 is thermally connected not only to the NTC 7 or fixed resistance but also to the PTC 15 and may be actuated to perform current cutoff by heat produced by both the NTC 7 or fixed resistance and the PTC 15.

Also, although in the first and second preferred embodiments described above only one thermally actuated switch 16 was used, it is also possible to employ a construction of the kind used in a third preferred embodiment shown in FIG. 3. The demagnetizing circuit of this third preferred embodiment comprises a first thermally actuated switch 17 connected in series with one end of a demagnetizing coil 8 by way of a PTC 15 and a second thermally actuated switch 18 connected in series with the other end of this demagnetizing coil 8, and both the first thermally actuated switch 17 and the second thermally actuated switch 18 are actuated to perform current cutoff by heat from the NTC 7 or fixed resistance.

When this kind of construction is employed, when both the first and second thermally actuated switches 17 and 18 are opened as a result of the current cutoff operation, the demagnetizing coil 8 is completely isolated from the commercial alternating current power supply 1. This has the merit that low-frequency electromagnetic fields, which have been a problem in connection with the impediment by the VDT and the like, are not produced in the demagnetizing coil 8.

Figure 3A:
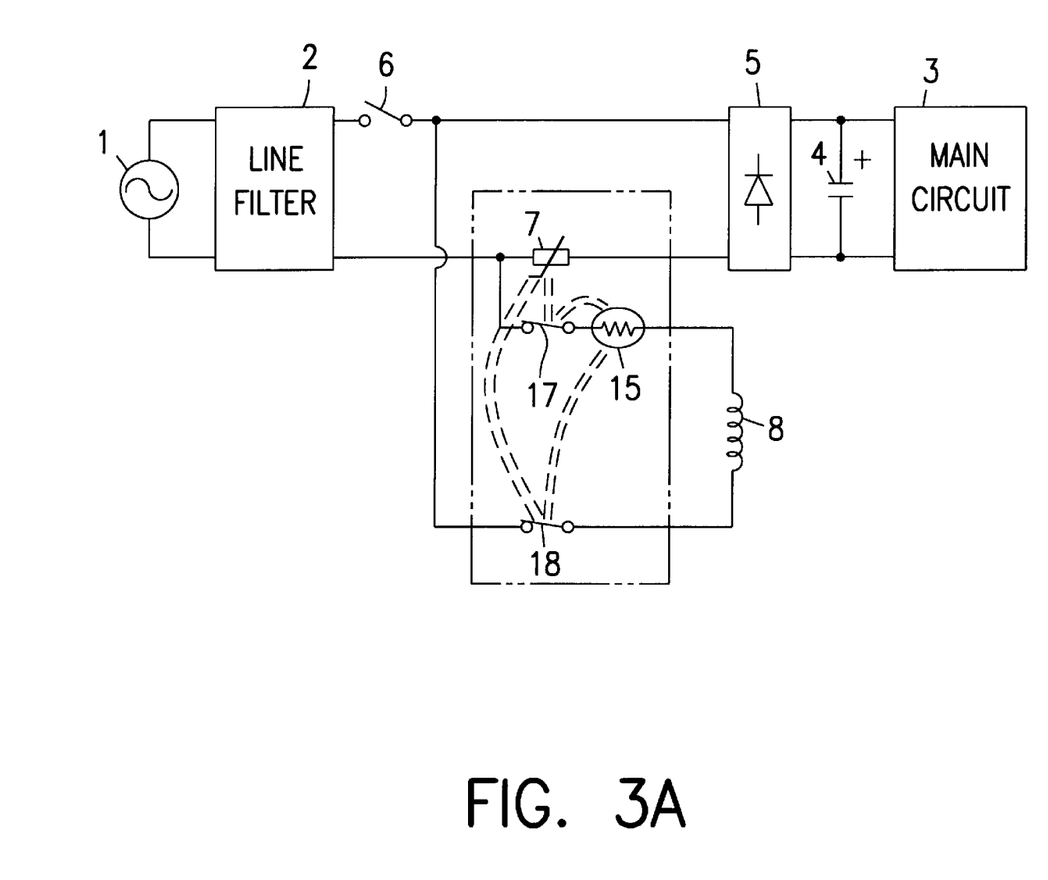
FIG. 3A is a schematic view showing a modification of the third preferred embodiment.

In the construction of this third preferred embodiment, both the first and second thermally actuated switches 17 and 18 are thermally connected to the NTC 7 or fixed resistance. However, the invention is not limited to this construction and although not shown in the drawings, for example, a construction can be employed as shown in FIG. 3A, wherein the first and second thermally actuated switches 17 and 18 are thermally connected both to the NTC 7 or fixed resistance and to the PTC 15.

Preferred Embodiments of Current Limiting Device

Figure 4A:
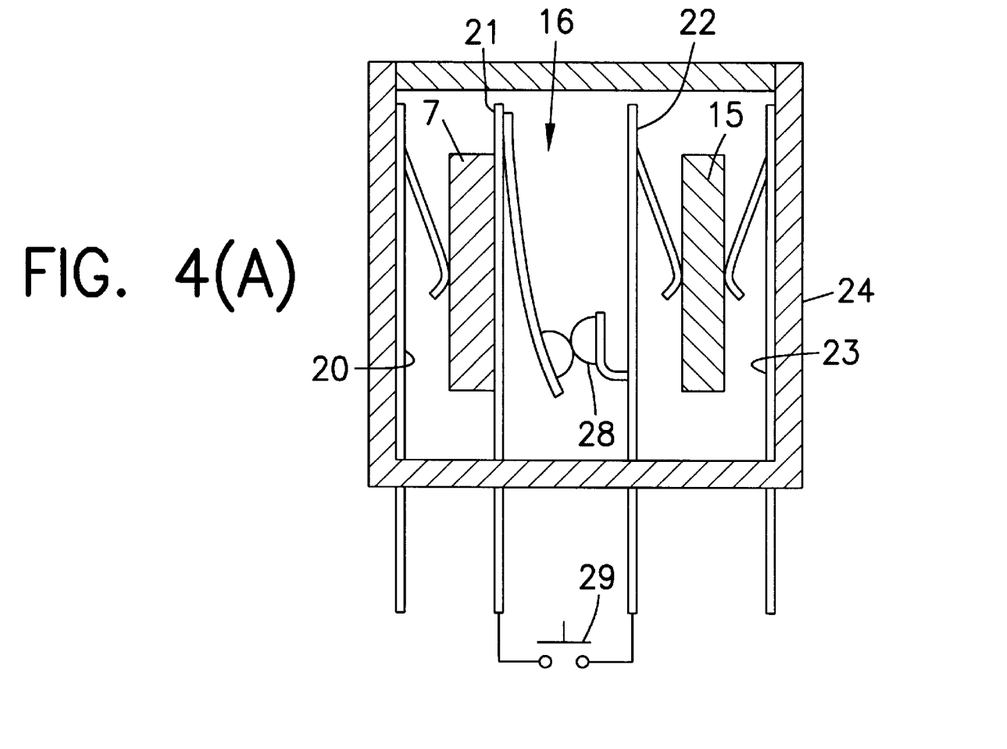
FIG. 4(a) is sectional side view and FIG. 4(b) a sectional plan view of the construction of a first preferred embodiment of a current limiting device according to the invention.
Figure 4B:
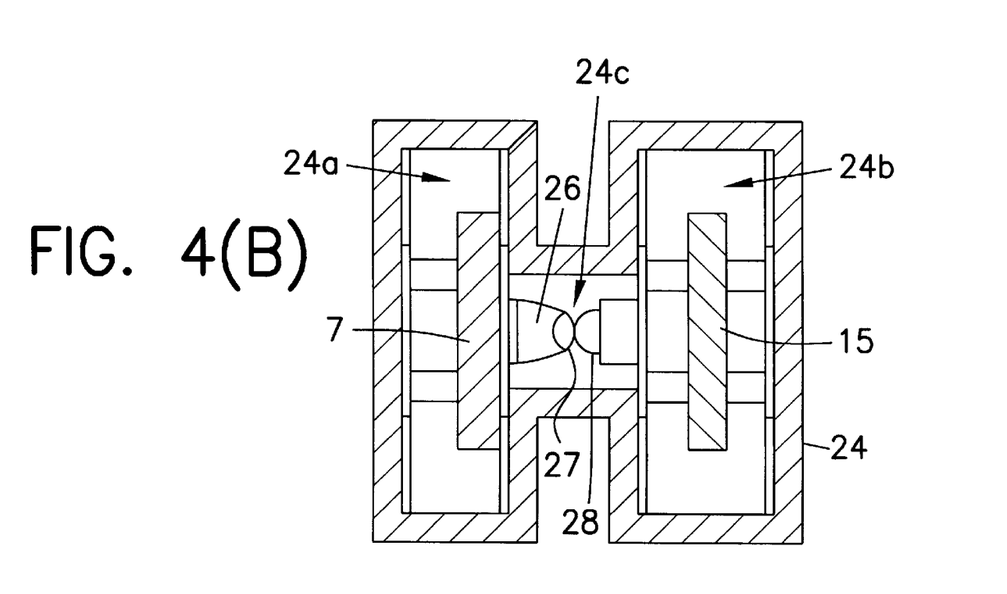

Next, preferred embodiments of current limiting devices according to the invention will be described. FIGS. 4(*a*) and 4(*b*) are views illustrating the construction of a current limiting device according to a first preferred embodiment, FIG. 5 is a view illustrating a modified version of a main part of the same current limiting device and FIG. 6(*a*) through FIG. 8(*b*) are views illustrating constructions of current limiting devices of second through fourth preferred embodiments.

The first preferred embodiment of a current limiting device according to the invention is a specific embodiment of the part enclosed by the broken line in the first preferred embodiment of a demagnetizing circuit shown in FIG. 1. As shown simplified in FIG. 4(*a*) and FIG. 4(*b*) this current limiting device comprises an NTC 7 sandwiched between a spring terminal 20 and a flat plate terminal 21, a PTC 15 sandwiched between a pair of spring terminals 22 and 23, a thermally actuated switch 16 disposed between the NTC 7 and the PTC 15, and a casing 24 made of resin or ceramic or the like which positions and houses these parts. An NTC housing chamber 24*a*, a PTC housing chamber 24*b* and a considerably narrower switch housing chamber 24*c* which connects the NTC housing chamber 24*a* and the PTC housing chamber 24*b* together are provided in this casing 24; the NTC 7 sandwiched between the spring terminal 20 and the flat plate terminal 21 is positioned and housed in the NTC housing chamber 24*a*, the PTC 15 sandwiched between the spring terminals 22 and 23 is positioned and housed in the PTC housing chamber 24*b* and the thermally actuated switch 16 is housed in the switch housing chamber 24*c*.

The thermally actuated switch 16 in this preferred embodiment is made up of a thermally actuated member 26 made of a bimetal or a shape-remembering alloy or the like which bends when heated, a normally ON moving contact point 27 and a fixed contact point 28 which are normally in contact with each other, or ON, and one end (in FIG. 4(*a*), the upper end) of the thermally actuated member 26, which is of a curved shape at room temperature, is fixedly attached by a method such as spot welding to the flat plate terminal 21 sandwiching the NTC 7. The moving contact point 27 is attached to the other end (in FIG. 4(*a*), the lower end) of this thermally actuated member 26. The fixed contact point 28 is provided at a predetermined position on the spring terminal 22. The moving contact point 27 and the fixed contact point 28 are separated when the thermally actuated member 26 is heated and bends.

Figure 5:
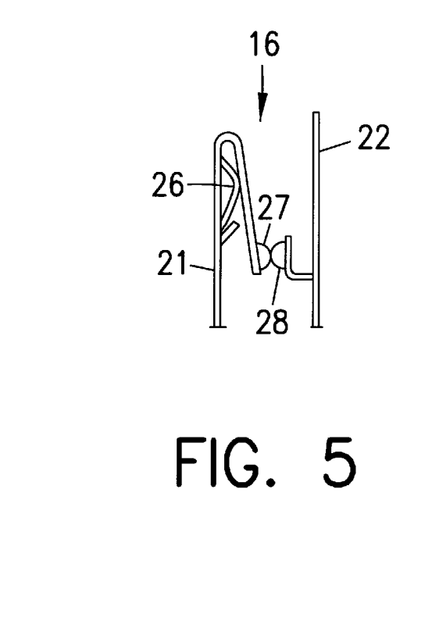
FIG. 5 is a view illustrating the construction of a modified version of a main part of the current limiting device of the first preferred embodiment.

The thermally actuated member 26 here may alternatively be of the construction shown in FIG. 5, that is, a construction wherein a thermally actuated member and a moving arm are separate, and the thermally actuated member may be attached to the flat plate terminal 21 by means of a stopper. Also, as the thermally actuated switch, instead of a bimetal switch a thermal reed switch can be used.

In the current limiting device of this first preferred embodiment, because the switch housing chamber 24*c* of the casing 24 is provided between the NTC 7 and the PTC 15 and the thermally actuated member 26 of the thermally actuated switch 16, housed inside this switch housing chamber 24*c*, is attached to the flat plate terminal 21 sandwiching the NTC 7, the thermally actuated member 26 is heated and caused to bend only by heat produced by the NTC 7. The moving contact point 27 and the fixed contact point 28 are separated, so that the switch 16 is turned OFF, by this bending of the thermally actuated member 26.

In the sectional side view of FIG. 4(a), the end of the spring terminal 22 sandwiching the PTC 15 and having the fixed contact point 28 attached thereto projects to outside the casing 24, but of course, as can be seen from the demagnetizing circuit shown in FIG. 1, it is not necessary that the end of the spring terminal 22 project to outside the casing 24. However, when the end of the spring terminal 22 does project to outside the casing 24, there is the merit that it is possible to provide an external switch 29 between this end outside the casing 24 and the flat plate terminal 21, and by switching this switch 29 ON, demagnetizing can be carried out even when the thermally actuated switch 16 is OFF.

A current limiting device of the construction described above operates as follows: First, when the main switch 6 of the power supply circuit is closed, a load current flows through the NTC 7 from the commercial alternating current power supply 1 and at the same time a demagnetizing current flows to the demagnetizing coil 8 through the PTC 15, and heat produced by the NTC 7 is transmitted through the flat plate terminal 21 to the thermally actuated member 26 of the thermally actuated switch 16. Consequently the thermally actuated member 26 is heated and bends, and when the thermally actuated member 26 bends, the moving contact point 27 and the fixed contact point 28 are separated and the thermally actuated switch 16 is turned OFF.

As a result, the flow of demagnetizing current which had been flowing to the demagnetizing coil 8 is cut off and the temperature of the PTC 15, which had been giving off heat, falls. However, because at this time the load current is still flowing through the NTC 7 and the NTC 7 is therefore continuing to produce heat, the thermally actuated switch 16 continues to be OFF. When the main switch 6 is opened, the NTC 7 stops producing heat and falls in temperature, and when the thermally actuated switch 16 which had been heated by this NTC 7 falls below its return temperature, the moving contact point 27 and the fixed contact point 28 come back into contact with each other and the thermally actuated switch 16 comes ON again. Even when the thermally actuated switch 16 comes ON again, no demagnetizing current flows through the demagnetizing coil 8, because the main switch 6 has been opened.

Figure 6A:
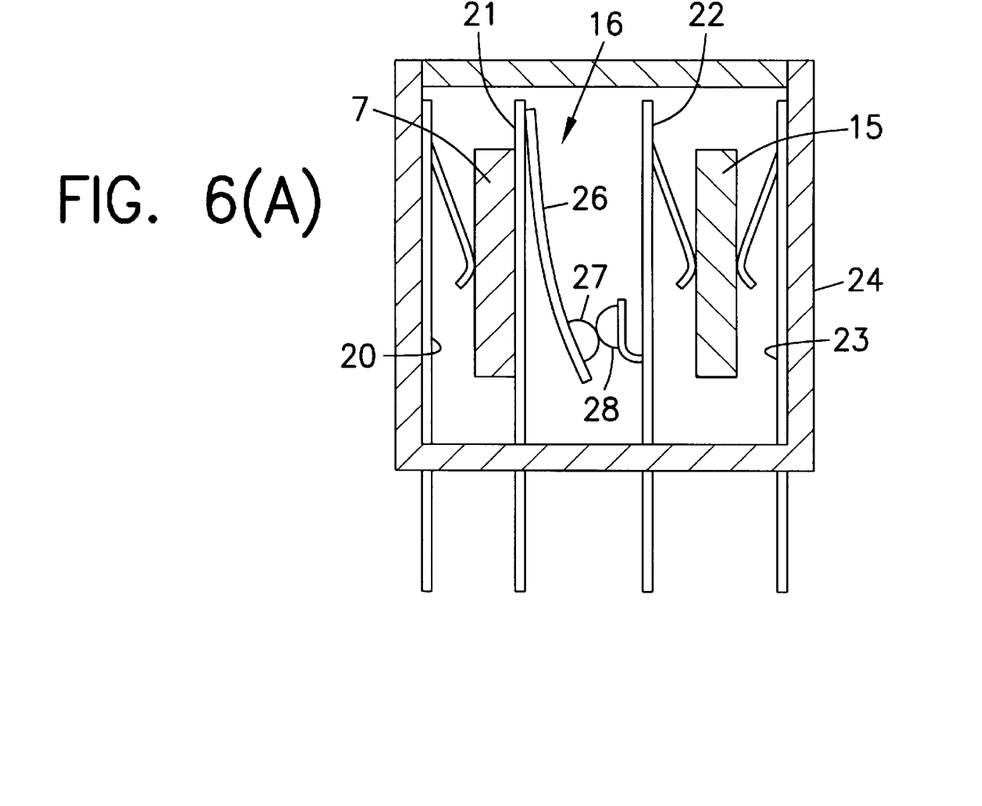
FIG. 6(a) is a sectional side view and FIG. 6(b) a sectional plan view of the construction of a second preferred embodiment of a current limiting device according to the invention.
Figure 6B:
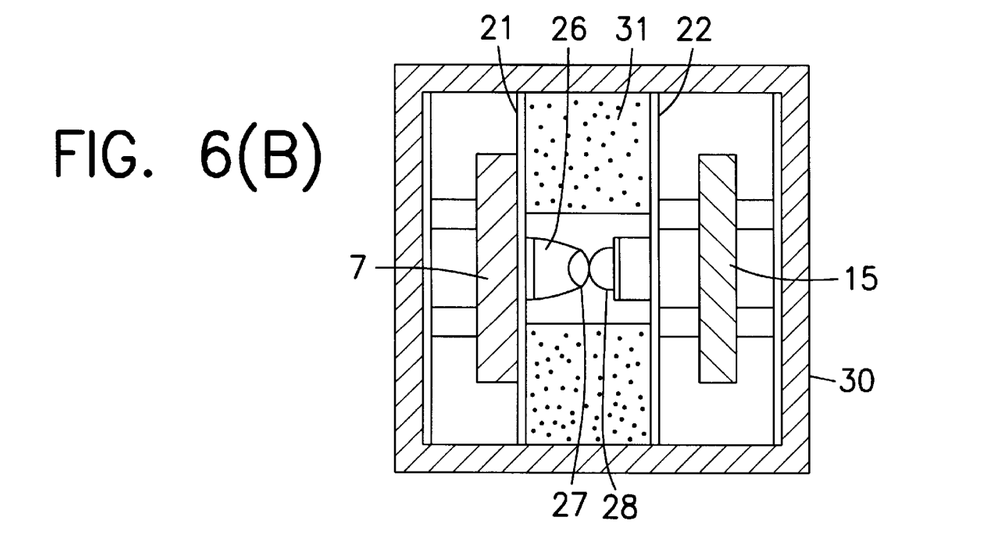

The construction of the current limiting device is not limited to that described above, and it is also possible for example to employ the construction shown in FIG. 6(a) and FIG. 6(b). This second preferred embodiment of a current limiting device according to the invention is a specific embodiment of the part enclosed by the broken line in the second preferred embodiment of a demagnetizing circuit shown in FIG. 2. As shown simplified in FIG. 6(a) and FIG. 6(b) this current limiting device comprises an NTC 7 sandwiched between a spring terminal 20 and a flat plate terminal 21, a PTC 15 sandwiched between a pair of spring terminals 22 and 23, a thermally actuated switch 16 disposed between the NTC 7 and the PTC 15 and a casing 30 made of resin or ceramic or the like which houses these parts.

The casing 30 in this preferred embodiment is of a uniform width, and the NTC 7 sandwiched between the spring terminal 20 and the flat plate terminal 21, the PTC 15 sandwiched by the spring terminals 22 and 23 and the thermally actuated switch 16 are all positioned and housed inside this casing 30. Also, in this preferred embodiment, a pair of heat-transmitting members 31 made of an electrical insulator having good thermal conductivity such as alumina or the like are interposed between the flat plate terminal 21 and the spring terminal 22 which face each other on either side of the thermally actuated switch 16, and both sides of the thermally actuated switch 16 are enclosed by these heat-transmitting members 31. The thermally actuated switch 16 is of the same construction as in the modified first preferred embodiment of FIG. 5 and therefore will not be described here.

In this second preferred embodiment, heat produced by the PTC 15 is also transmitted to the flat plate terminal 21 adjacent to the NTC 7 by way of the heat-transmitting members 31, and as a result the thermally actuated switch 16 of the current limiting device is heated not only by the NTC 7 or fixed resistance but also by the PTC 15D That is, the thermally actuated switch 16 of this current limiting device is characterized in that it comprises the thermally actuated member 26 caused to bend by heat produced by the NTC 7 or fixed resistance and the PTC 15.

The current limiting devices of the first and second preferred embodiments described above both comprise one thermally actuated switch 16. However, the invention is not limited to this construction and it is also possible to realize a current limiting device having two thermally actuated switches, which is a specific embodiment of the part enclosed by the broken line in the third preferred embodiment of a demagnetizing circuit shown in FIG. 3. That is, it is possible to realize a third preferred embodiment of a current limiting device according to the invention having the construction shown in simplified form in the sectional side view of FIG. 7(a) and the sectional plan view of FIG. 7(b).

Figure 7A:
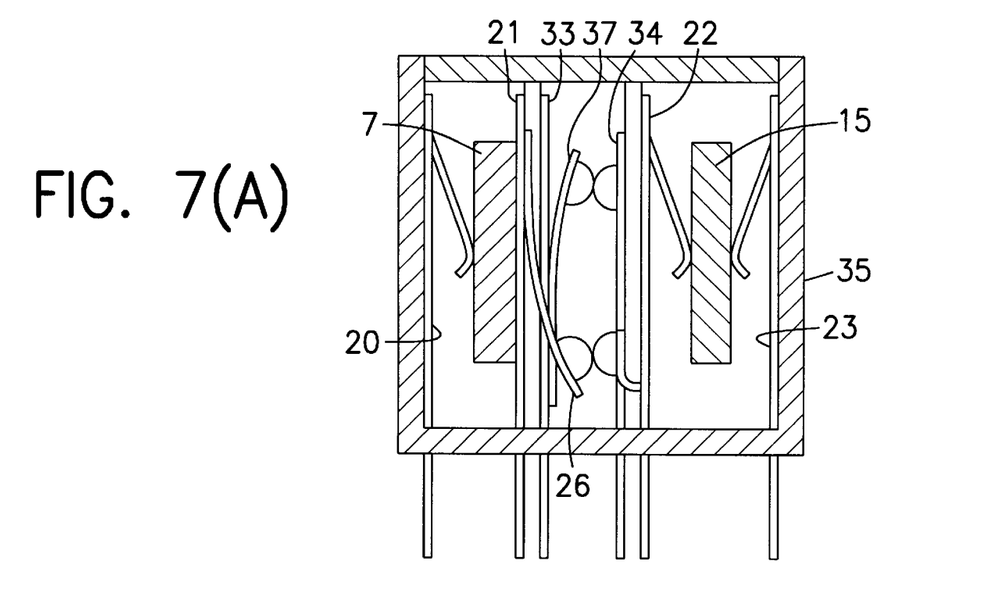
FIG. 7(a) is a sectional side view and FIG. 7(b) a sectional plan view of the construction of a third preferred embodiment of a current limiting device according to the invention.
Figure 7B:
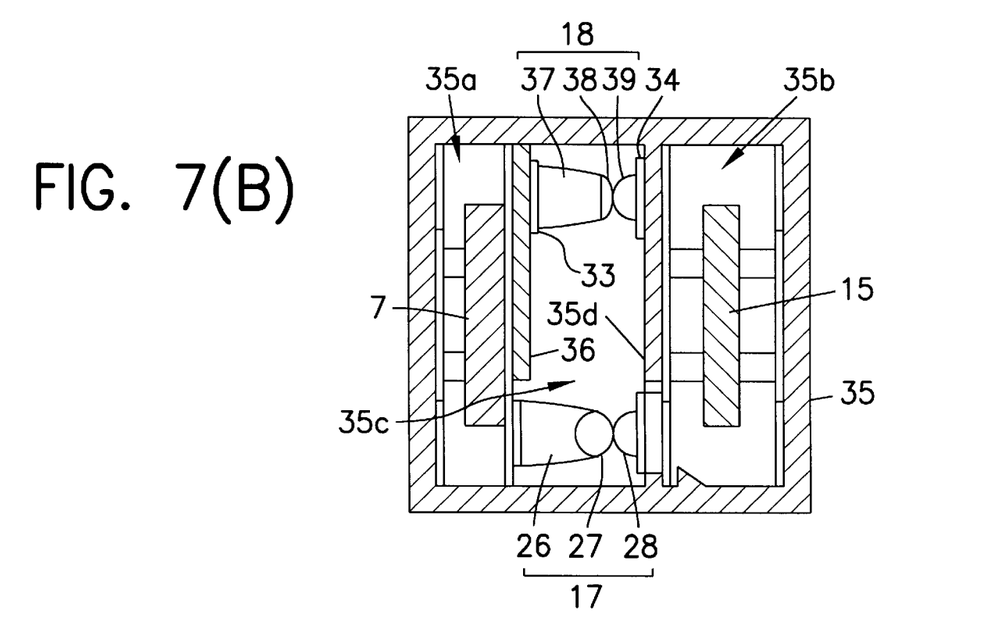

This third preferred embodiment of a current limiting device according to the invention comprises an NTC 7 sandwiched between a spring terminal 20 and a flat plate terminal 21, a PTC 15 sandwiched by a pair of spring terminals 22 and 23, a first thermally actuated switch 17 disposed between the NTC 7 and the PTC 15, a second thermally actuated switch 18 disposed between a pair of flat plate terminals 33 and 34 and a casing 35 which positions and houses all these parts. The inside of this casing 35 is partitioned into an NTC housing chamber 35a, a PTC housing chamber 35b and a switch housing chamber 35c connecting the NTC housing chamber 35a and the PTC housing chamber 35b together. A heat-transmitting member 36 made of an electrical insulator having good thermal conductivity such as alumina or the like is interposed between the NTC housing chamber 35a and the switch housing chamber 35c, and a partition wall 35d extending from the casing 35 is provided between the PTC housing chamber 35b and the switch housing chamber 35c.

The NTC 7 sandwiched by the spring terminal 20 and the flat plate terminal 21 is positioned and housed in the NTC housing chamber 35a of this casing 35, the PTC 15 sandwiched by the spring terminals 22 and 23 is positioned and housed in the PTC housing chamber 35b and the first and second thermally actuated switches 17 and 18 are housed in parallel with each other in the switch housing chamber 35c. The first thermally actuated switch 17, like the thermally actuated switch 16 in the second preferred embodiment, is made up of a thermally actuated member 26 such as a bimetal having one end (in FIG. 7(a), the upper end) attached to the flat plate terminal 21 sandwiching the NTC 7. A moving contact point 27 attached to the other end (in FIG. 7(a), the lower end) of the thermally actuated member 26, which is of a curved shape at room temperature, and a fixed contact point 28 attached to the spring terminal 22 sandwiching the PTC 15 are normally in contact with each other, so that thermally actuated switch 17 is normally ON. The operation of the first thermally actuated switch 17 is the same as that of the thermally actuated switch 16 in the second preferred embodiment and therefore will not be described here.

The second thermally actuated switch 18 in this preferred embodiment comprises a thermally actuated member 37 such as a bimetal having one end (in FIG. 7(a), the lower end) attached to the flat plate 33 facing the flat plate terminal 21 with the heat-transmitting member 36 therebetween and a moving contact point 38 and a fixed contact point 39 which are normally in contact with each other, so that the thermally actuated switch 18 is normally ON; the moving contact point 38 is attached to the other end (in FIG. 7(a), the upper end) of the thermally actuated member 37, which is of a curved shape at room temperature, and the fixed contact point 39 is mounted on a flat plate terminal 34 supported by the partition wall 35d of the casing 35. This second thermally actuated switch 18 is opened by the moving contact point 38 and the fixed contact point 39 being separated by the bending of the thermally actuated member 37. By turning OFF at the same time as the first thermally actuated switch 17, the second thermally actuated switch 18 performs the function of completely isolating the demagnetizing coil 8 from the commercial alternating current power supply 1.

Figure 8A:
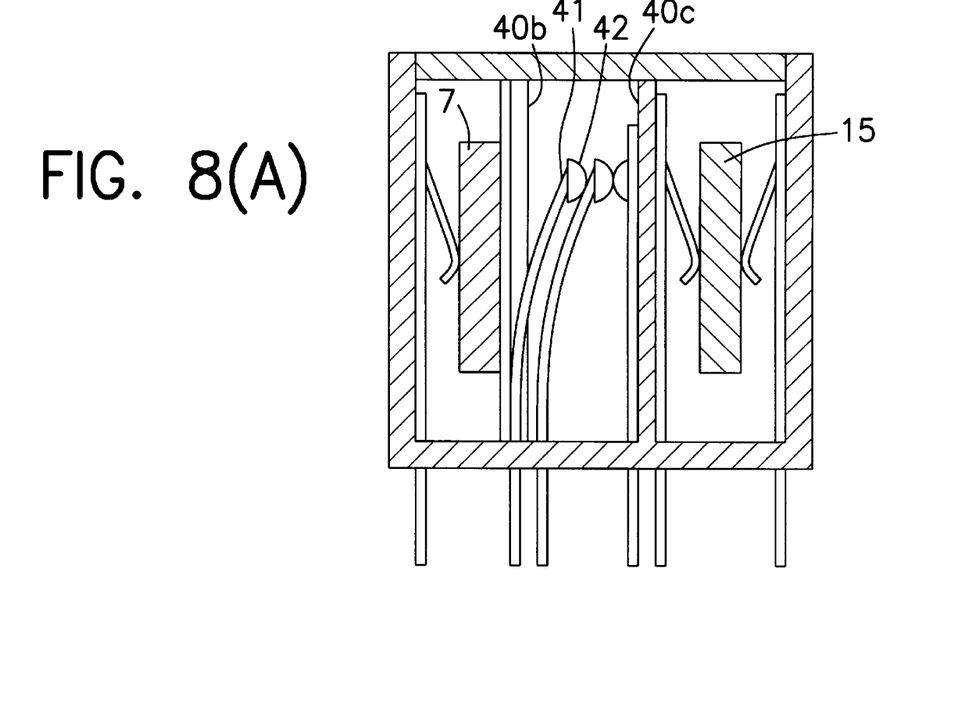
FIG. 8(a) is a sectional side view and FIG. 8(b) a sectional plan view of the construction of a modified version of a third preferred embodiment of a current limiting device according to the invention.
Figure 8B:
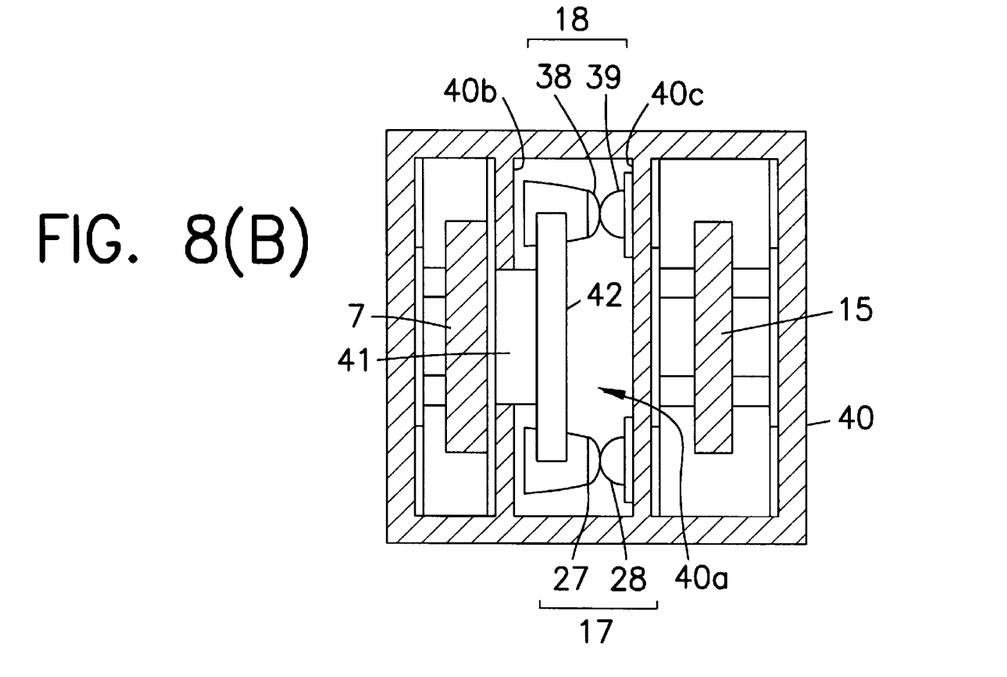

In the current limiting device of this third preferred embodiment, the first and second thermally actuated switches 17 and 18 have the thermally actuated members 26 and 37 respectively, but it is also possible to employ a modified version for example of the kind shown in the sectional side view of FIG. 8(a) and the sectional plan view of FIG. 8(b). That is, in this modified version of the current limiting device of the third preferred embodiment, a switch housing chamber 40a in a casing 40 is partitioned by partition walls 40b and 40c projecting from the walls of the casing 40. The first and second thermally actuated switches 17 and 18 have plate spring structures as best seen in FIG. 8(a), and also comprise a thermally actuated member 41 supported by the flat plate terminal 21 sandwiching the NTC 7 and a connecting member 42 made of an insulator attached to this thermally actuated member 41, which bears against the first and second thermally actuated switches 17 and 180 In this modified structure, the thermally actuated member 41 is caused to bend by heat produced by the NTC 7 and this bending of the thermally actuated member 41 causes the moving contact points 27 and 38 of the first and second thermally actuated switches 17 and 18, which are connected to each other by the connecting member 42, to move away from the fixed contact points 28 and 39 and as a result the demagnetizing current which had been flowing to the demagnetizing coil 8 is cut off.

As described above, in a demagnetizing circuit with a current limiting device according to the invention it is not necessary to use a PTC which produces heat and reaches a high temperature even after a demagnetizing operation is concluded, or a relay circuit having a complex construction and occupying a large area, which have conventionally been necessary. Therefore, the invention has the benefits that power consumption can be reduced and a greatly simplified and cheap construction can be provided. Also, there are the benefits that the occurrence of low-frequency electromagnetic fields can be prevented by cutting off residual currents in the demagnetizing circuit, and various types of noise produced in the demagnetizing circuit can be reduced.

Although the present invention has been described in relation to particular embodiments thereof, many other variations and modifications and other uses will become apparent to those skilled in the art. Therefore, the present invention is not limited by the specific disclosure herein.

What is claimed is:

1. A demagnetizing circuit connected with a power supply circuit having a smoothing capacitor and a current limiting resistance connected for suppressing surge currents to the smoothing capacitor, the demagnetizing circuit comprising:

a demagnetizing coil having two ends;

a first thermally actuated switch having openable and closable contacts;

said first thermally actuated switch being connected in a series circuit with one end of the demagnetizing coil and a positive temperature characteristic thermistor, the positive temperature characteristic thermistor being interposed in said series circuit between said first thermally actuated switch and said one end of said demagnetizing coil, whereby current is applied from said power supply circuit to said demagnetizing coil through said first thermally actuated switch and said PTC thermistor in that order;

the first thermally actuated switch being responsive to heat produced by the current limiting resistance for cutting off current to the demagnetizing coil.

2. A demagnetizing circuit according to claim 1, wherein said current limiting resistance is a negative temperature characteristic thermistor.

3. A demagnetizing circuit according to claim 1, wherein the first switch is further responsive to heat produced by the positive temperature characteristic thermistor.

4. A demagnetizing circuit according to claim 1, further comprising a second thermally actuated switch connected in series with the other end of the demagnetizing coil, the second thermally actuated switch being responsive to heat produced by the current limiting resistance for cutting off current to the demagnetizing coil.

5. A demagnetizing circuit according to claim 4, wherein the first switch is further responsive to heat produced by the positive temperature characteristic thermistor.

6. A demagnetizing circuit according to claim 5, wherein said second switch is also responsive to heat produced by the positive temperature characteristic thermistor.

7. A demagnetizing circuit according to claim 4, wherein said second switch is also responsive to heat produced by the positive temperature characteristic thermistor.

8. A demagnetizing circuit connected with a power supply curcuit having a smoothing capacitor and a current limiting resistance connected for suppressing surge currents to the smoothing capacitor, the demagnetizing circuit comprising:

a demagnetizing coil having two ends;

a first thermally actuated switch having openable and closable contacts;

said first thermally actuated switch being connected in a series circuit with one end of the demagnetizing coil and a positive temperature characteristic thermistor, the positive characteristic thermistor being interposed in said series curcuit between said first thermally actuated switch and said one end of said demagnetizing coil, whereby current is applied from said power supply current to said demagnetizing coil through said first thermally actuated switch and said PTC thermistor in that order;

the first thermally actuated switch being resposive to heat produced by the current limiting resistance or cutting off current to the demagnetizing coil;

said current limiting resistance, said first thermally actuated switch, and said themistor being contained in a urinary current limiting devise comprising a casing, said first thermally actuated switch being interposed between the resistance and the positive temperature characteristic thermistor within said casing;

wherein the thermally actuated switch comprises a thermally actuated member which is bendable in response to heat produced by the resistance so as to separate said contacts and thereby open said first thermally actuated switch.

9. A demagnetizing circuit according to claim 8, wherein the thermally actuated member is further responsive to heat produced by the positive temperature characteristic thermistor.

10. A demagnetizing circuit according to claim 9, further comprising a second thermally actuated switch interposed between the resistance and positive temperature characteristic thermistor, wherein the second thermally actuated switch comprises a second thermally actuated member which is bendable in response to heat produced by the resistance so as to separate a pair of contacts thereof and thereby open said second thermally actuated switch.

11. A demagnitizing circuit according to claim 10, wherein said second thermally actuated member in said second switch is also responsive to heat produced by the positive temperature characteristic thermistor.

12. A demagnitizing circuit according to claim 8, further comprising a second thermally actuated switch interposed between the resistance and the positive temperature characteristic themistor, wherein the second thermally actuated switch comprises a second thermally actuated member which is bendable in response to heat produced by the resistance so as to separate a pair of contacts thereof and thereby open said second thermally actuated switch.

13. A demagnetizing circuit according to claim 12, wherein said second thermally actuated member in said second switch is also responsive to heat produced by the positive temperature characteristic thermistor.

14. A demagnetizing circuit according to claim 11, wherein said resistance is a negative temperature characteristic thermistor.

15. A demagnetizing circuit according to claim 11, wherein the first switch is further responsive to heat produced by the positive temperature characteristic thermistor.

16. A demagnetizing circuit according to claim 15, further comprising a second thermally actuated switch interposed between the resistance and the positive temperature characteristic thermistor, wherein the second thermally actuated switch comprises a second thermally actuated member which is bendable in response to heat produced by the resistance so as to separate a pair of contacts thereof and thereby open said second thermally actuated switch.

17. A demagnetizing circuit according to claim 16, wherein said second thermally actuated member in said second switch is also responsive to heat produced by the positive temperature characteristic thermistor.

* * * * *